July 6, 1954   R. G. LOHRE ET AL   2,682,832
APPARATUS FOR REMOVAL OF JUICE FROM CITRUS FRUIT
Filed July 5, 1950   3 Sheets-Sheet 1

INVENTORS:
RALPH G. LOHRE
JOSEPH L. PITZER
BY
ATTORNEYS.

July 6, 1954  R. G. LOHRE ET AL  2,682,832
APPARATUS FOR REMOVAL OF JUICE FROM CITRUS FRUIT
Filed July 5, 1950  3 Sheets-Sheet 2
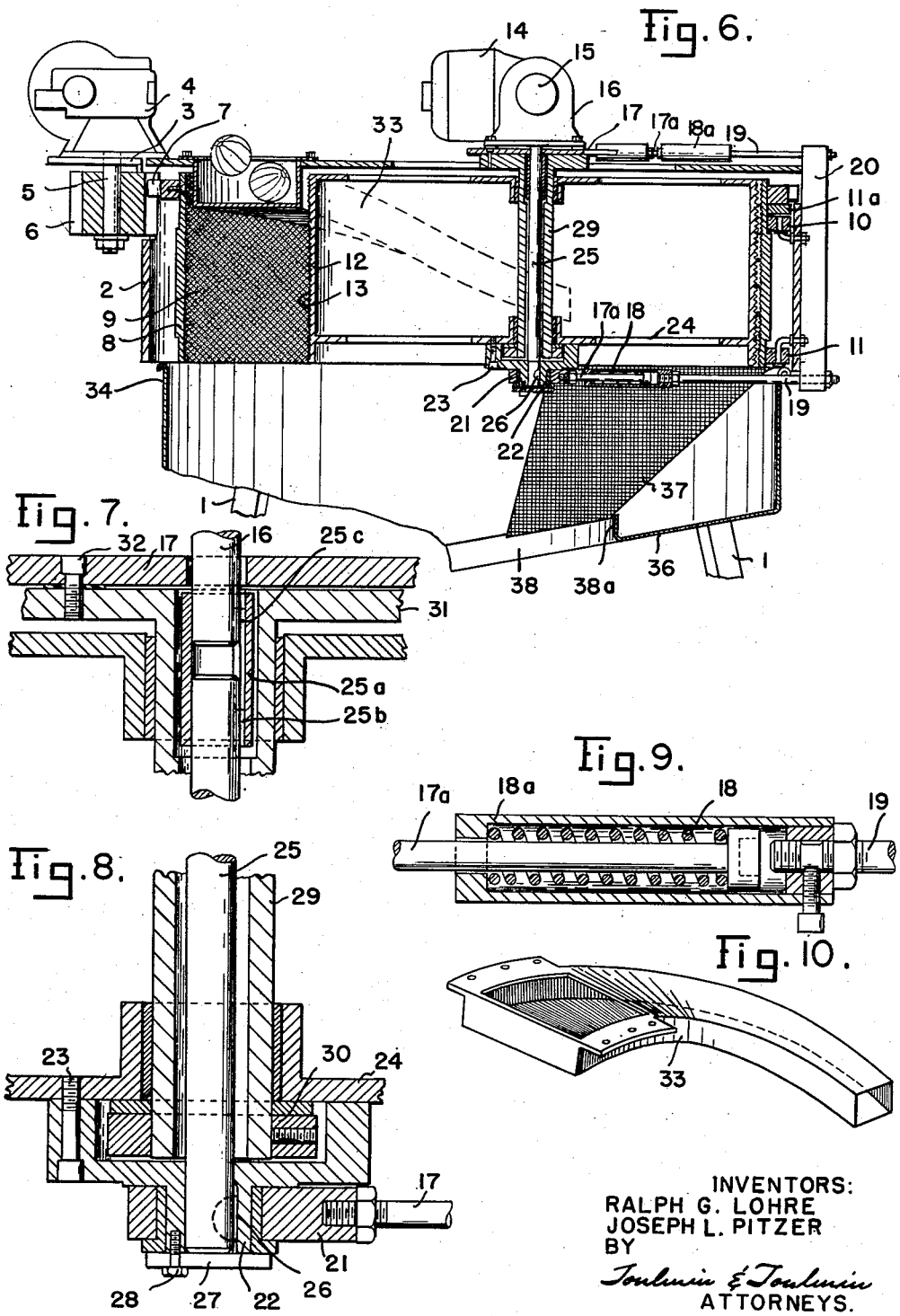
INVENTORS:
RALPH G. LOHRE
JOSEPH L. PITZER
BY
Toulmin & Toulmin
ATTORNEYS.

July 6, 1954 R. G. LOHRE ET AL 2,682,832
APPARATUS FOR REMOVAL OF JUICE FROM CITRUS FRUIT
Filed July 5, 1950 3 Sheets-Sheet 3

INVENTORS:
RALPH G. LOHRE
JOSEPH L. PITZER
BY
ATTORNEYS.

Patented July 6, 1954

2,682,832

UNITED STATES PATENT OFFICE 2,682,832

APPARATUS FOR REMOVAL OF JUICE FROM CITRUS FRUIT

Ralph G. Lohre and Joseph L. Pitzer, Dunedin, Fla., assignors to Extraction, Inc., Dayton, Ohio, a corporation of Delaware Application July 5, 1950, Serial No. 172,162

4 Claims. (Cl. 100—121)

This invention relates to extracting juice from fruit.

It is the object of this invention to provide an apparatus for extracting juice from fruit, particularly citrus fruit, in which the fruit is crushed to cause its skin or cover to rupture so that the juice and seeds may make their exit from the fruit enclosure with minimum destruction of the fruit cells, no injury to the juice and without rupture of the seeds.

It is a further object to provide means of extracting juice without cutting the fruit in half or otherwise utilizing cutting mechanism so as to avoid contamination of bacteria, enzymes, and the like. It is a further object to provide a machine which permits a complete treating of the fruit and any refuse as a result of the use of the machine in order to maintain it in its bacteria free condition.

It is a further object of this invention to provide means, in association with the peeler mechanism shown in our co-pending application Serial No. 172,161 filed July 5, 1950, now Patent No. 2,676,633, in the United States Patent Office whereby the fruit, as in the case of citrus fruit, has its exterior yellow cover abraded therefrom to gather up the entrained bacteria, enzymes and peel oil so that the flavedo is exposed and in some instances the fruit is abraded down to the albedo. In the machine of the instant invention the introduction of fruit contained in the white flavedo covering enables it to be readily compressed and ruptured.

A further object of this invention is to accomplish what has not hitherto been accomplished in the art of extracting juice from fruit, particularly citrus fruit, and that is to have a universal press which will accommodate automatically, all sizes of fruit, without the necessity for grading or necessity for separate presses for separate sizes of fruit. Due to the novel construction and method of operation of the instant invention it is possible to introduce fruits of different sizes which will automatically be pressed to their fullest extent by this press. This eliminates heavy investment, complicated machinery, heavy charges for maintenance and heavy charges for labor, both for personal labor and machine labor in the sorting of fruit.

It is a further object to be able to secure juice from the fruit in such a manner that the fruit is retained in its entirety until the instant of juicing at which time the juice is expelled at high speed due to the collapse of the cover of the fruit so that both the juice and the seeds make their exit in such a manner that the seeds are not crushed. This eliminates entraining in the juice the offensive chemicals and odors of crushed seeds. It also facilitates the straining of the seeds and the sorting of the seeds from the juice.

It is a further object to be able to retain the seeds in their whole condition so they may be utilized in a separate process for the extraction of their valuable oils for the industrial finish and other industries. By having the seeds in their whole condition it is possible to transport them, to retain the juices with the oils and other chemicals in the seeds as carriers for such oils and chemicals without drying until the ultimate rupture of the seeds is practiced at the time of extracting the oil from the seeds. This has hitherto not been possible with the existing machines for extracting juice from citrus fruits. After the crushing of the seed and removal of the seed oil, the crushed seeds provide a satisfactory source of protein for stock food.

Turning to the drawings, Figure 1 is a top plan view of the mechanism of this invention having parts broken away to better show the structure thereof.

Figure 6 is a section of the line 6—6 of Figure 1 looking in the direction of the arrow.

Figure 7 is an enlarged detailed view of the upper bearing structure of the drum support for crushing.

Figure 8 is a similar view of the lower shaft support.

Figure 9 is a detailed view of the crushing drum support for yieldingly retaining the drum against the fruit for maximum crushing action. This enables the drum to accommodate itself to different sizes of fruit.

Figure 10 is an isometric view of the feeding chute for the fruit to deliver the fruit to the bottom of the eccentric drum so the fruit will be placed in position for the minimum travel necessary to pressing.

Figure 1:
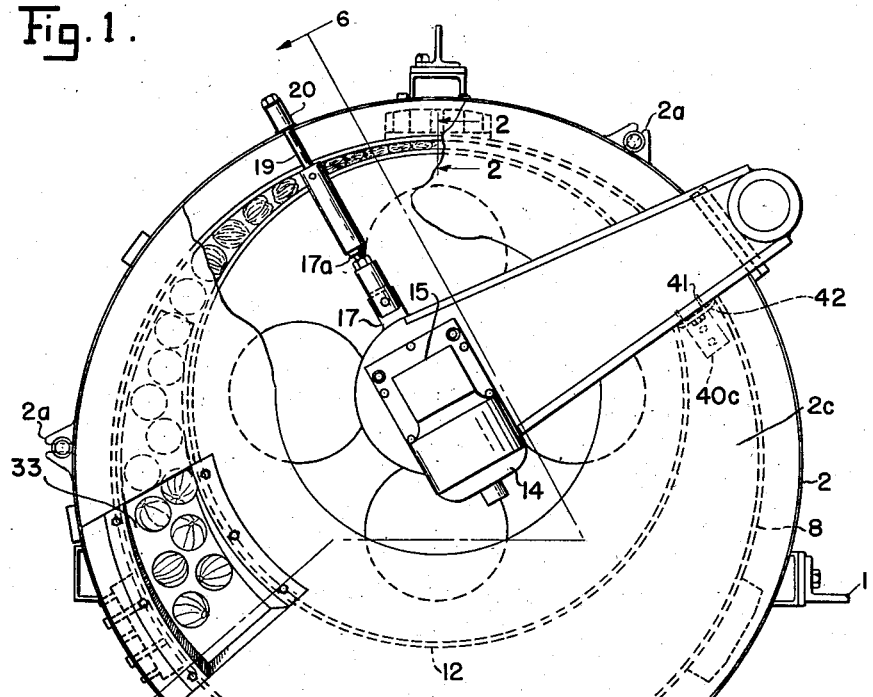

Turning to the drawings, the following is a detailed description of the mechanism and method of extracting juice from fruit as practiced with the instant invention. The plurality of legs 1 converge upwardly and attach at their upper end to a stationary drum 2 open at the top and bottom and having supported at the top, as by the posts 2a, a cover plate 2c. The posts 2a may be welded to drum 2. Mounted on the top of this drum 2 is a motor support 3 supporting the motor 4. This motor is provided with a speed reducing mechanism that has a drive shaft 5 on which is mounted a pinion 6 engaging with a ring gear 7 mounted on the top of the drum 8. This drum is knurled at 9 on the interior thereof. It is supported on a series of laterally disposed rollers 10 and 11. This drum is therefore rotated and is held against lateral movement. This holding of this drum by rollers mounted upon bearings both against vertical and horizontal movement will become significant upon the accomplishment of the complete description of this mechanism.

Also mounted on top of the drum 2 and supported by it is an arcuate chute 33 for guiding the fruit from a position at the top of and within the drum 8 and within the drum 2 to a point near the bottom of the drum 8 and between the drum 8 and the inner drum 12. The exterior of the drum 12 is knurled in the same manner as the knurling 9 on the interior of the outer drum. Mounted on top of the drum 2 is a second motor 14 which has a speed reducing mechanism 15 that drives the shaft 16. This motor and its associated mechanism is mounted on the top of the drum 2, the same being fastened to a plate 17 having a projection that is connected by a clevis to a rod 17a and compression coil spring 18 in sleeve 18a attached to a plunger 19 anchored at 20. This coil spring 18 is so arranged as to urge the inner drum 12 toward the inner surface of the drum 8 to reduce the space therebetween at the top of Figure 1. The construction and arrangement of rod 17a, spring 18, sleeve 18a and rod 19 is shown in Figure 9. A substantially identical mechanism, and, thus correspondingly numbered, is provided at the bottom beneath the drum 12 as follows. The lower end of the support 20 supports a second rod 19 that supports one end of a second sleeve 18a in which is located a second spring 18 which is connected to a head on the second rod 17a at one end. This second rod 17a is, however, connected to a yoke 21 mounted on a collar or sleeve 22. This sleeve is connected by bolts 23 to the bottom 24 of the inner drum 12. The sleeve 22 also carries the shaft 25 to which it is keyed by the key 26. The shaft 25 is retained from moving downwardly by the closure plate 27 which is retained by the bolt 28 on the end of the sleeve 22. The shaft 25 is connected at its upper end to a sleeve 25a by key 25b. The other end of the sleeve is connected by key 25c to the lower end of the shaft 16. Shaft 25 is surrounded by a sleeve 29 that extends from a bearing 30 at the bottom upwardly to the plate 31 where it is attached by the bolt 32 to the plate 17 on which the motor and gear drive rest.

This spring arrangement is for the purpose of compressing the fruit and also of making it possible to accommodate the space between the drums according to the different sizes of fruit.

Figure 11:
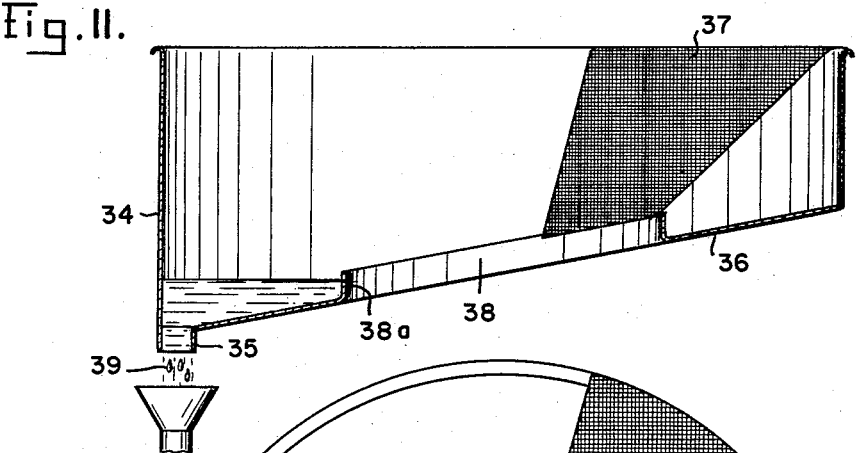
Figure 11 is a detailed view in section of the bottom hopper for collecting the juice and seeds and for the discharge of the exterior portion of the fruit as refuse. This comprises the pulp discharge.
Figure 12:
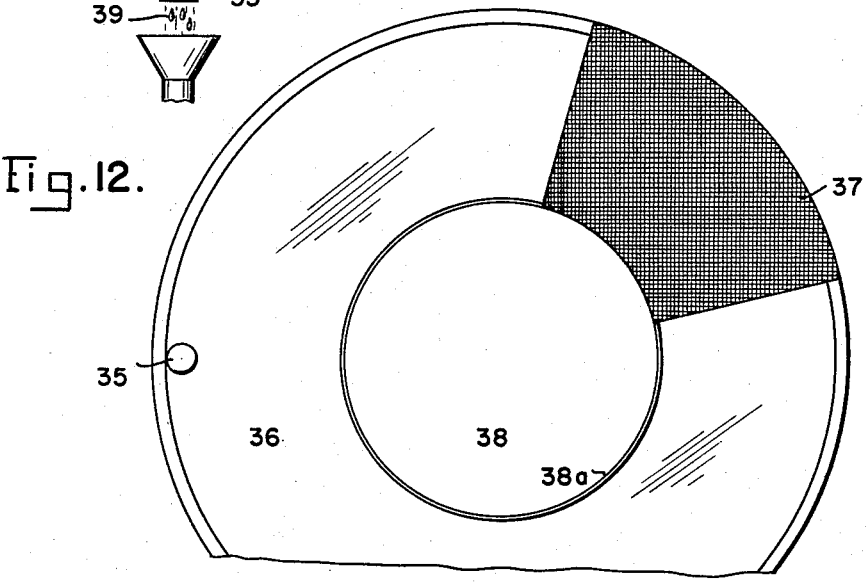
Figure 12 is a part plan view of the inside of Figure 11 looking downwardly.
Figure 13:
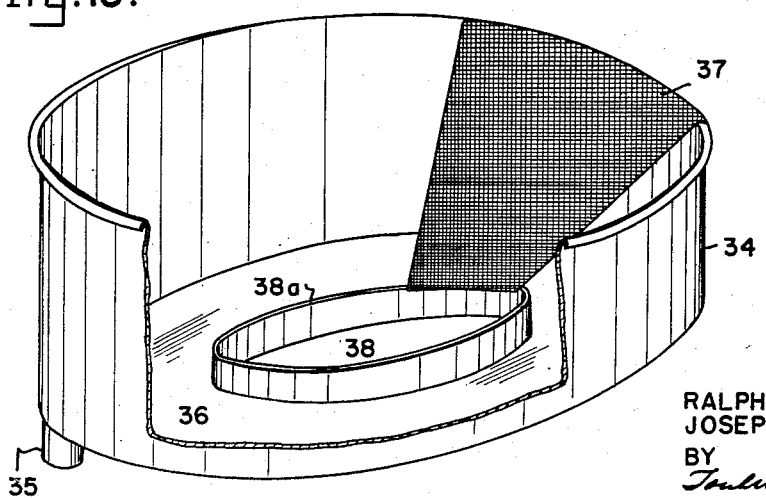
Figure 13 is an isometric view of the pulp screen for directing the pulp from the point of issue from between the compressing drums through the discharge opening in the center of the juice collecting drum shown in Figure 11.

It will thus be seen that there are spring pressed plungers connecting the upper and lower ends of the internal supporting shaft of the inner drum 12 so as to uniformly press it laterally against the inner wall of the drum 8. It is between these drums that the fruit is drawn by the knurled surfaces 9 and 13 of the respective drums so as to compress the fruit between the drums at their point of nearest approach. This is accomplished by directing the fruit through the passageway in chute 33 which consists of a ball ramp (see Figure 10) through which the fruit descends one by one to the space between the two drums. At that point as the fruit issues between the two drums it is drawn by the knurled surfaces into the space between the drums closely adjacent to one another, the fruit is compressed, ruptured and the seeds and juice are expelled at high velocity out of the covering of the fruit and downwardly into the collecting pan generally designated 34. The action of the springs 18 drawing the inner drum 12 against the outer drum and against the fruit entrapped between the inner and outer drum produces a thrust which is taken by the rollers 10 and 11 which are preferably mounted upon needle bearings. The rollers 11a also serve to support the outer drum 8 in its rotation about the inner drum 12. As both drums are driven in the same direction but preferably at controlled different speeds, it is possible to accommodate the mechanism to different types and sizes and kinds of fruit from which the seeds and juice are to be extracted. As the juice will readily descend into the pan 34 and then out the opening 35 due to the sloping bottom 36, the rotation of the two drums with the fruit skins and refuse imprisoned between them will convey this refuse to a point above the screen 37. This screen extends from the upper edge of the outer wall of the drum 34 downwardly and diagonally to a point where it rests upon the rim of the wall 38a about the opening 38. Thus the pulp is directed downwardly and out through this opening where it can be disposed of while the juice has already passed into the pan and out the opening 35. Thus the juice and the pulp are automatically separated one from the other without contamination of the juice. The seeds pass out primarily with the juice as indicated in Figure 11 at 39. They are screened in the usual manner by a vibrating screen and are removed in whole condition. This enables them to be easily dried, preserved, and their essential oils in the seeds preserved from drying due to the fact that they are not ruptured.

In order to insure that the refuse on the walls of the inner and outer drums is appropriately discharged as heretofore indicated over the screen 37, a scraper is provided comprising a stationary U-shaped bar 40 having flanges 41. This bar carries a resilient scraper, the opposite edges of which engage the inner and outer knurled walls of the two drums to scrape them free of any refuse. This scraper is designated 42. The refuse material thus scraped off descends through the opening 43, over the screen 37 and out the opening 38 to a point of collection.

Figure 3:
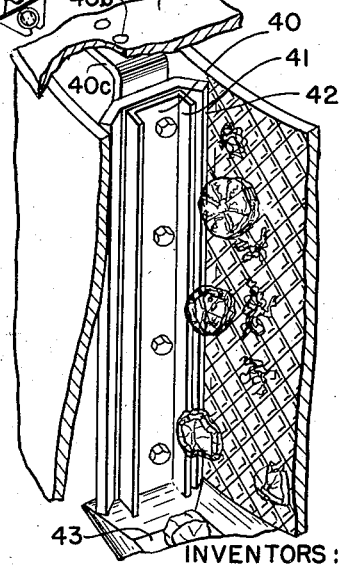
Figure 3 is a detailed isometric view partially in section showing the scraper mechanism for removing any of the refuse due to the rupturing of the fruit from the internal and external compression drums.

As will be seen in Figure 3, scraper 42 is clamped between stationary bar 40 and the fixed bar 40c by bolts 40b. Bar 40c is supported as by being connected to the stationary top plate 2b as by bolts 2c.

Figure 2:
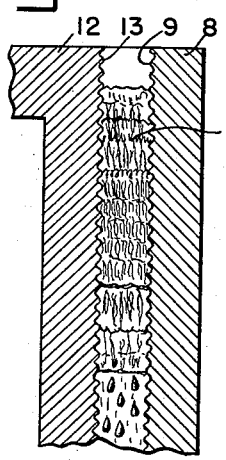
Figure 2 is a section on the line 2—2 of Figure 1 looking in the direction of arrows indicating the condition of the fruit when it is at its maximum compression and the juice is making its exit.
Figure 4:
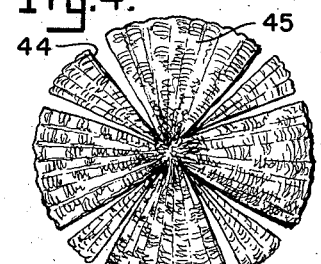
Figure 4 is a view of a piece of crushed fruit showing its rupture into segments. The juice makes its exit between these segments.
Figure 5:
Figure 5 is a side elevation of Figure 4.

By reference to Figure 2, it will be seen that the fruit is crushed between the two knurled surfaces of the inner and outer drum so that the juice will be suddenly expelled through the rupture opening 44 in the albedo covering 45 of the fruit.

It will be observed that the pan for collecting the juice and directing the refuse to the central opening in the pan is readily detachable for cleaning. The same is true of the rest of the mechanism which can be cleaned with a hose or other high pressure fluid mechanism in order to maintain it in a sanitary condition. By utilizing springs 18 of different compression strength, it is possible to adjust the amount of compression desired according to the type of fruit. The machine is automatic and needs no attention. So long as the fruit is delivered one by one in the usual manner into the chute 33, the machine will continue to operate by which it compresses the fruit, removes the juice, removes the seed and discharges the refuse through the central opening 38.

The outer and inner drums travel at different relative speeds, the outer drum traveling faster than the inner drum. This causes the fruit to rotate into crushing position with the least abrasion of the fruit in order to prevent the creation of undesirable refuse which would be carried into the juice. The typical relationship between the two drums is indicated as follows: a 36 inch inside diameter outer drum is used with a 28½ inch outside diameter inner drum. The peripheries of the drums are brought closely adjacent to one another so that the outer wall of the inner drum and the inner wall of the outer drum come into substantial abutting engagement between which surfaces the movement of drums draws the fruit for crushing and the expulsion of juice and seeds. Due to the method of compressing the fruit, the pressure generated on the juice is such that when the albedo ruptures, the juice is forced out at high velocity and escapes the interior of the fruit so as to carry away with it the seeds. The interior rag, however, remains in position so that it does not get into the juice. This release of pressure that has been applied to the juice by compression provides clean juice and clean peel. The juice has removed from it by the usual shaker mechanism the seed and pulp for re-use elsewhere.

The eccentric relationship of the drums with the inner drum being held yieldingly against the inside of the outer drum with the space for the track for delivering fruit being located between the drums, all provides an automatic means for accommodating the drums to the size of the fruit and of uniformly pressing the fruit as it moves between the drums for final pressing.

It will be understood that we desire to comprehend within our hereinafter appended claims such modifications of construction and methods of operation as may be thoroughly comprehended within their terms in view of the scope of this invention.

We claim:

1. In combination, a stationary container, an outer drum mounted therein and rotatable on a vertically disposed axis, the interior surface of said drum being knurled, means on the outer side of the outer drum for driving said drum, an inner drum eccentrically located on an axis parallel to the axis of the outer drum and arranged to rotate within said outer drum, the outer surface of said inner drum being knurled, means yieldingly urging the inner drum toward the inner surface of the wall of the outer drum, means for independently rotating the inner drum in the same direction as the outer drum, but at a different speed, an annular collector chute disposed beneath said drums for collecting juice extracted from fruit compressed by said rotatable drums, and means for collecting the fruit juice and discharging the refuse pulp of the fruit upon the extraction of juice therefrom, said last mentioned means comprising an inclined screen arranged across said chute, and scraper means disposed between said drums and over the said screen.

2. In a juicing machine, an outer drum mounted for rotation on a vertical axis and means for rotating the drum, an inner drum inside the outer drum also rotatable on a vertical axis, a frame rotatably supporting the outer drum, means arranged at one side of the frame forming a support for the vertical axis of said inner drum, arms extending inwardly from said support and journaling the opposite ends of said inner drum, resilient means acting on said arms for urging the inner drum toward one wall of the outer drum, a motor mounted on the frame for driving said outer drum, and a second motor mounted on one of said arms drivingly connected with the inner drum for rotating it in the same direction as the said outer drum rotates, said drums being imperforate and the inner surface of the outer drum and the outer surface of the inner drum being knurled with a relatively shallow configuration whereby the fruit is rolled between the drums but is not abraded and the expression of juice from the fruit comes about solely because of the pressure developed thereon as the fruit is moved into the tapering throat between the drums and is not caused by any puncturing of the outer surface of the fruit by the knurling on the drums.

3. In a juicing machine, an outer drum mounted for rotation on a vertical axis and means for rotating the drum, an inner drum inside the outer drum also rotatable on a vertical axis, a frame rotatably supporting the outer drum, means arranged at one side of the frame forming a support for the vertical axis of said inner drum, arms extending inwardly from said support and journaling the opposite ends of said inner drum, resilient means acting on said arms for urging the inner drum toward one wall of the outer drum, a motor mounted on the frame for driving said outer drum, and a second motor mounted on one of said arms drivingly connected with the inner drum for rotating it in the same direction as the said outer drum rotates, said drums being imperforate and the inner surface of the outer drum and the outer surface of the inner drum being knurled with a relatively shallow configuration whereby the fruit is rolled between the drums but is not abraded and the expression of juice from the fruit comes about solely because of the pressure developed thereon as the fruit is moved into the tapering throat between the drums and is not caused by any puncturing of the outer surface of the fruit by the knurling on the drums, there being an arcuate downwardly inclined feed chute extending about the inner periphery of the outer drum adjacent the upper end thereof, and an annular collector chute about the bottom of said drums to receive the expressed juice from between the drums.

4. In a juicing machine, an outer drum mounted for rotation on a vertical axis and means for rotating the drum, an inner drum inside the outer drum also rotatable on a vertical axis, a frame rotatably supporting the outer drum, means arranged at one side of the frame forming a support for the vertical axis, arms extending inwardly from said support and journaling the opposite ends of said inner drum, resilient means acting on said arms for urging the inner drum toward one wall of the outer drum, a motor mounted on the frame for driving said outer drum, and a second motor mounted on one of said arms drivingly connected with the inner drum for rotating it in the same direction as the said outer drum rotates, said drums being imperforate and the inner surface of the outer drum and the outer surface of the inner drum being knurled with a relatively shallow configuration whereby the fruit is rolled between the drums but is not abraded and the expression of juice from the fruit comes about solely because of the pressure developed thereon as the fruit is moved into the tapering throat between the drums and is not caused by any puncturing of the outer surface of the fruit by the knurling on the drums, there being an arcuate downwardly inclined feed chute extending about the inner periphery of the outer drum adjacent the upper end thereof, and an annular collector chute about the bottom of said drums to receive the expressed juice from between the drums, said collector chute comprising an inclined screen extending thereacross beneath the drums at a point beyond the point where the juice is expressed from the fruit, and said drums comprising means for discharging the fruit residue from therebetween at said point.

References Cited in the file of this patent

UNITED STATES PATENTS

| Number | Name | Date |
|---|---|---|
| 49,088 | Crerer et al. | Aug. 1, 1865 |
| 206,630 | Smith | July 30, 1878 |
| 286,582 | Borchard | Oct. 16, 1883 |
| 307,702 | Avery | Nov. 4, 1884 |
| 410,879 | Cornelius | Sept. 10, 1889 |
| 435,636 | Williams | Sept. 2, 1890 |
| 1,104,937 | Schiffmann | July 28, 1914 |
| 1,265,206 | Jenkins | May 7, 1918 |
| 1,655,333 | Perazio | Jan. 3, 1928 |
| 1,850,001 | D'Annunzio | Mar. 15, 1932 |
| 1,957,883 | Grayson | May 8, 1934 |
| 2,196,650 | Allen | Apr. 9, 1940 |
| 2,229,141 | Stacom | Jan. 21, 1941 |
| 2,261,257 | Kiesskalt | Nov. 4, 1941 |
| 2,282,887 | Roberts | May 12, 1942 |

FOREIGN PATENTS

| Number | Country | Date |
|---|---|---|
| 12,223 | Sweden | Mar. 30, 1901 |